United States Patent [19]

Beseme et al.

[11] Patent Number: 4,559,709
[45] Date of Patent: Dec. 24, 1985

[54] APPARATUS FOR MEASURING THE INTERNAL DIMENSIONS OF A TUBE, NOTABLY IN A WELL, AND DISPLACEMENT MEASUREMENT METHOD APPLICABLE TO SUCH AN APPARATUS

[75] Inventors: Jean H. Beseme, Veneux-les-Sablons; José R. Corral, Vaux-le-Pénil; Bernard J. Glotin, Saint-Maur, all of France

[73] Assignee: Schlumberger Technology Corporation, New York, N.Y.

[21] Appl. No.: 452,232

[22] Filed: Dec. 22, 1982

[30] Foreign Application Priority Data

Dec. 23, 1981 [FR] France ............................. 81 24179

[51] Int. Cl.⁴ ............................. G01B 7/12; G01B 7/28
[52] U.S. Cl. .................................. 33/178 F; 33/178 E
[58] Field of Search ......... 33/178 E, 178 F, DIG. 13, 33/174 P, 174 PA, 174 L, 551, 552

[56] References Cited

U.S. PATENT DOCUMENTS

| | | | |
|---|---|---|---|
| 2,908,085 | 10/1959 | Price et al. | 33/178 F |
| 3,075,292 | 1/1963 | Berry et al. | 33/178 F |
| 4,186,494 | 2/1980 | Edouard et al. | 33/178 F |

Primary Examiner—Harry N. Haroian

[57] ABSTRACT

A caliper logging sonde is equipped with a plurality of fingers (54) mounted swivelably with respect to its body member (51). The movement of each finger (54) is transmitted to a respective bar (176) in magnetic material. This bar moves within a longitudinal tube (136) which is mounted in a sealed manner with respect to the sonde body member so that its interior is subjected to the pressure outside the sonde and so that the space around this tube is not subjected to this pressure. Around the tube is mounted a transducer winding (150) whose self-inductance depends on the degree of penetration of the bar (176) and hence on the displacement to be measured. A measurement of this self-inductance is obtained by the study of the variation of a current going through the coil when a voltage transient is applied to the coil terminals.

13 Claims, 11 Drawing Figures

FIG. 11

APPARATUS FOR MEASURING THE INTERNAL DIMENSIONS OF A TUBE, NOTABLY IN A WELL, AND DISPLACEMENT MEASUREMENT METHOD APPLICABLE TO SUCH AN APPARATUS

The present invention relates to the measurement of displacements and has to do notably with tools intended for the measurement of the internal dimensions of tubes, notably in order to check their condition.

There are many installations in which steel tubes are subjected to the action of abrasive or corrosive agents which ultimately cause the deterioration of their internal surface so as to make them unsuitable for use. Such is the case in particular in oil, gas or geothermal wells in which the inner wall is lined with a steel casing and within which is suspended a production string which connects a producing stratum to a wellhead in order to bring the produced fluids to the surface.

There are prior art finger-type sondes, also referred to as calipers or caliper logging sondes, which are capable of being moved within a casing string to be checked and whose sensing fingers are loaded against the wall of the casing, the variations in the displacement of the fingers being measured as the sonde is moved within the casing.

There are also prior art mechanical recording apparatus in which the generally swiveling movement of the fingers is recorded on a rotating cylinder driven according to the movement of the sonde within the tube. A drawback of these apparatus is their relatively great mechanical complexity for a relatively low accurancy, moreover requiring relatively complicated handling operations for placing and removing the recording cylinder.

There are also, as for example described in Peruchon et al. U.S. Pat. No. 4,186,494, sondes in which the movement of each finger in contact with the inside wall of the tube is converted by a transducer into an electric signal which can be transmitted remotely, as by means of an electric conductor in a cable from which it may be suspended.

Such a transducer is made up of one or more coils within which a core made of a high magnetic permeability material is imparted a linear movement according to the displacement of the respective finger in contact with the tube wall.

Such a transducer is however bulky and only a limited number of fingers can be placed around the sonde owing to the insufficient space for the corresponding transducers within the sonde. From the operating standpoint, these apparatus are poorly suited to sequential measurements, which are desirable in the case where these measurements must be transmitted in series on a cable. The stabilization time of a measurement circuit after it has been connected to a coil following a switching operation is in fact generally relatively high. This factor limits the sampling frequency of the displacement transducers associated with each finger. The speed at which the sonde can be moved within the tube is thus limited. If, to overcome this drawback, one wishes to measure the displacements picked up by each coil continuously, it is necessary to provide a special measurement circuit comprising in particular an oscillator for each coil, the outputs of these circuits being interrogated sequentially by a multiplexer for transmission. This solution is not only relatively costly, but it also increases the size of the measurement circuits. Moreover, prior art displacement transducers are often poorly suited to precise measurements when there are large temperature fluctuations, which is especially the case within oil wells.

From the mechanical standpoint, prior art caliper logging devices of the electromagnetic transducer type are poorly suited to high pressures, either owing to the difficultly of providing sealed passages toward the processing electronics for the very large number of electric conductors required when the measurement coils are subjected to the pressure outside the sonde or, on the contrary, owing to the need to provide seals of complex design between each sensing finger and the magnetic core of the corresponding transducer.

According to one feature of the present invention, an apparatus for measuring the internal dimensions of a tube is provided which is particularly well suited to tubes subjected to conditions, particularly pressure, in which the use of measuring instruments is usually difficult. Such an apparatus comprises an elongated sonde body member capable of being moved within the tube to be checked, a plurality of sensing fingers distributed around the sonde body member and capable of moving radially in accordance with the variations in the transverse dimensions of the tube, and a displacement transducer for measuring the movement of each finger. This apparatus is characterized notably by the fact that each finger comprises an element which can move longitudinally within a blind tube made of a nonmagnetic material, mounted in a sealed manner in the sonde body member so that its inner space is subjected to the pressure of the surrounding medium in which the sonde is immersed and so that at least part of the space around this tube is not subjected to this pressure, this space containing a detector sensitive to the movement of the mobile element within the blind tube. Transmission means are provided between the finger and said element, and the detector is connected to a circuit capable of delivering an electric signal representative of the movements of said mobile element. This mobile element can consist of a bar made of magnetically permeable material, the detector being an electric coil.

According to one embodiment, the blind tubes of the transducers are fitted in longitudinal holes made in a solid barrel linked with the sonde body member. Their open ends form a ring on one of the end faces of the barrel. Their closed ends each fit into and individual recess in the barrel in which is located the respective detector.

In another embodiment, the transmission means comprise a pumping device capable of relieving the mobile element of any transverse stresses with respect to its direction of travel in response to the movement of the respective finger. In addition, said transmission means are mounted in a channel within the body member, connected at its two ends by passages leading outside this body member.

According to another feature, the invention provides a caliper logging sonde comprising a plurality of electromagnetic transducer distributed around the body member, each transducer being sensitive to the displacement of a finger mounted moveably on the body member according to variations in the transverse dimensions of a tube in which the sonde is moved, the design of which is substantially improved compared with prior art devices. In this respect, it is characterized notably in that each of the transducers comprises a coil and a high magnetic permeability core mounted inside this coil, this core and this coil being capable of moving with respect to each other according to the transverse displacements of a respective finger, and in that each coil is mounted in an electric circuit which includes means for applying a voltage transient to it, and means for measuring the time required for an electrical characteristic of the circuit in which the coil is mounted to undergo a predetermined evolution in response to said transient. One thus obtains a time measurement which varies according to the time constant of the circuit in which the coil is inserted, this time constant itself depending on the degree of penetration of the core into the coil. This evolution of the electrical characteristic corresponds preferably to a variation in the current in the coil between two valves located within a predetermined ratio in relation to each other. The first value is advantageously that of a current applied through a resistance connected in series with the coil, this series circuit being short-circuited at the beginning of the measurement to apply said transient in the form of a voltage step. The means for measuring the time interval relative to the evolution of the characteristic being checked advantageously comprise a clock pulse counter directly delivering a numerical indication of the time interval involved.

According to a preferred embodiment of the invention, multiplexing means are also provided to connect the coil of each transducer sequentially to a measurement circuit capable of executing a measurement cycle on this coil, this circuit being common to all the transducers. From the output of this circuit, it is easy to carry out serial transmission of the measurements performed by the different transducers. The measurement cycle of each transducer can include an establishment phase for a given current within the coil, followed by a build-up phase up to a predetermined fraction of its value.

Owing to the very simple and compact design of these transducers, a caliper logging sonde is obtained which can include a large number of sensing fingers each connected to a corresponding transducer in a sonde of small diameter.

It is notably possible to obtain, at least over a major part of the travel of each finger, a time measurement which can vary practically linearly with its displacement and can be directly displayed numerically in a sequential manner that is easy to transmit along a serial transmission line.

According to another feature, the invention also provides a method for measuring a displacement by means of a transducer comprising a coil and a core of high magnetic permeability moving in relation to each other in accordance with the displacement to be determined, characterized notably by the fact that one applies a voltage transient to this coil and one measures the time necessary for a predetermined evolution of an electrical characteristic of the circuit in which the coil is inserted according to this transient.

The invention also provides a displacement transducer operating according to the general method just described, as well as different embodiments of the latter which will appear from the explanations to follow.

A nonlimitative description of an embodiment is given with reference to the appended drawings in which.

Figure 1:
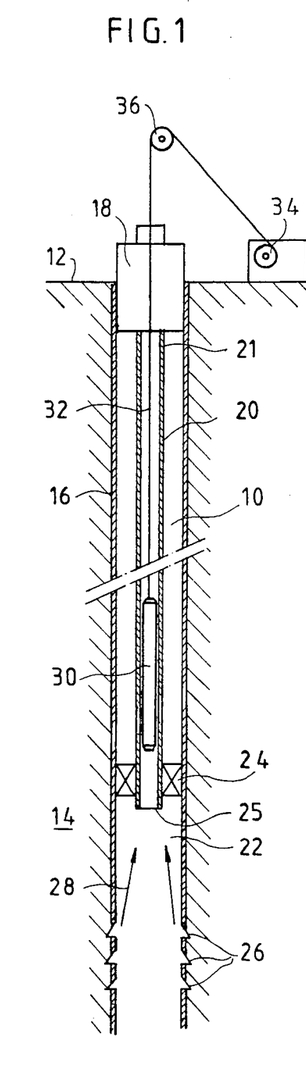
FIG. 1 represents a caliper logging sonde in a well shown in longitudinal section.

An oil well (FIG. 1) 10 penetrates from the surface of the ground 12 through geological formations 14. It is bordered by a steel casing 16 which makes it possible to consolidate the walls of the well. On the surface, the well is closed by a wellhead 18 connected to the top of a production string 20 having a diameter smaller than that of the casing and descending within the casing down to a zone 22 delimited on top by a packer 24 between the lower end 25 of the production string 20 and the casing 16. The production string 20 is used for bringing to the surface the fluids produced in the part of the well 22 thanks to perforations such as 26 in the wall of the casing. The fluids which can flow along a rising path shown schematically by the arrows 28 can carry sand and abrasive particles with them. In addition, they may contain chemical compounds liable to attack the steel of the tubes making up the casing 16 and the production string 20. These tubes are thus subjected to corrosive phenomena which can ultimately affect their performance. It is thus important to monitor the condition of these tubes. For this purpose, their diameters can be measured by means of a caliper logging sonde 30 which is lowered into the well 10 through the production string 20 at the end of a cable 32 which is wound from a winch 34 on the surface running over a return pulley 36 located vertically over the well. This cable is used not only for the mechanical support of the sonde, but also for the transfer of electrical information, particularly measurements, between the sonde and the surface as well as the power supply of the electric circuits equipping the sonde.

The sonde 30 (FIG. 2) comprises an elongated body member whose diameter is adapted to the dimension of either the casing 16 or the production tubing 20 in which the tool 30 is to carry out measurements, or which it must traverse to reach the zone of the well located under the packer 24.

Figure 2:
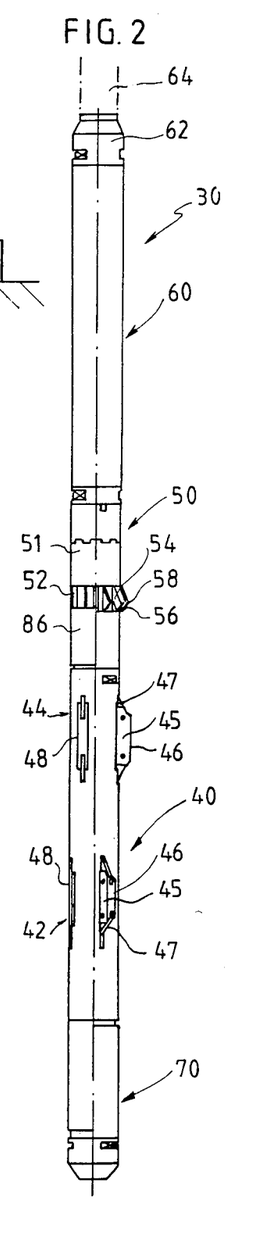
FIG. 2 represents an elevation of such a sonde.

A sonde 30, described here as an example, comprises four longitudinal modules connected end-to-end: a guiding module 40, a caliper logging module 50 (properly so-called in the functional position of the tool in a well over the module 40), a cartridge 60 enclosing the electronic circuits necessary for the operation of the sonde and which can be connected at its upper end 62 to a tool head 64 equipped with means for attaching the cable 32. The lower part 42 of the guiding module is connected to an actuating module 70 constituting the terminal end of the sonde opposite the attachment of the cable 32.

The module 40 is equipped with two stages, respectively 42 and 44, and three retractable centralizing pads.

Each stage includes three pads 45 distributed evenly around the cylindrical body of the module 40, the pads of the stage 42 being staggered in relation to those of the stage 44. The pads 45 are shown on the right in FIG. 2 in an extended position in which their external surface 46 can come into contact with the wall of the tube in which the sonde is being moved, for example the wall of the production string tubing 20, so as to keep the sonde in a position as closely centered as possible with respect to the axis of the tubing 20. The faces of the surfaces 46 are elongated so as to allow moving contact along the inner surface of the tubing 20 when the tool is moved within the tubing. The pads 45 are mounted at the end of connecting rods 47 hinged inside the body of the module 40 in elongated openings 48 into which the pads 45 can be retracted in a position illustrated on the left in FIG. 2. Resilient means (not shown) make it possible to apply the pads 45 when they are extended out of their recesses 48 in the operational position with an adjustable force against the wall of the tube in which the sonde is used. When the sonde is introduced into the tube to be checked, the pads 45 are in the retracted position in their recess. They can be actuated to their operational position for centering the sonde within this tube in response to an electric signal which controls the actuating module 70 according to a conventional design principle.

The caliper head 50 comprises a series of rectangular openings 52 distributed uniformly around the cylindrical body of this head 50 and within which are placed respective fingers 54 capable of occupying two positions, a retracted position inside the openings 52, as shown on the left in FIG. 2 and an extended position as shown on the right in FIG. 2. In the latter position, the lower end 56 of each finger tends to move away from the sonde body to allow a contact tip 58 to come into contact with the wall of the tube within which the sonde is centered by the module 40.

Figure 3:
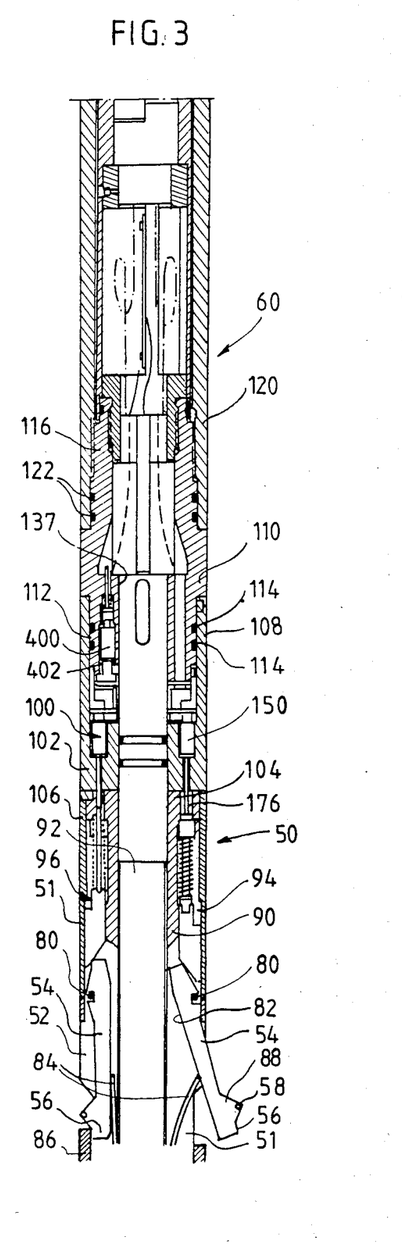
FIG. 3 represents a longitudinal section of part of the sonde of FIG. 2.

FIG. 3 shows in greater detail the make up of the caliper head 50 and a portion of the electronic cartridge 60 at its upper part.

Each finger 54 is composed of an elongated metal arm which is articulated in relation to the caliper body 51 around an axis 80 so as to be able to swivel in a longitudinal diametrical plane from a retracted position inside the recesses or openings 52, in which a sleeve 86, mounted slidably longitudinally around the caliper body 51 at the bottom of the latter, holds the lower end 56 of the arm 54 against the pressure exerted by a leaf spring 84 on the back face 82 of the finger at an intermediate point between this end 56 and the swiveling axis 80. In the extended position, the sleeve 86 is withdrawn by downward sliding so as to free the end 56 of the arm 54 which tends to be driven outward by the action of the spring 84 while swiveling around the axis 80. Immediately over its lower end 56, the arm 54 of the sensing finger has a triangular nose 88 projecting away from the sonde and terminating in the contact tip 58. The latter is made of a relatively hard material in order to resist wear due to friction against the internal wall of the tube in which the sonde 30 is inserted. When the sonde is introduced into this tube, for example the production tubing 20, the six fingers 54 are kept in the retracted position within their respective recesses 52 by the upper lip of the sleeve 86 (see left side of FIGS. 2 and 3). At the beginning of the measurement, the sleeve 86 moves downward under the action of the actuating module 70 (right side of FIGS. 2 and 3) through control linkage (not shown) and the centering pads 45 are driven outward. From this moment, each finger comes into contact, through its contact tip 58, with a respective generatrix of the tube to be tested, the radial position of this contact tip depending on the radius of the tube on the contact generatrix at the point of contact. The swiveling angle of the finger 54 varies with the variations in this radius resulting normally from wear or from different degrees of internal corrosion within the tube in which the sonde is used. All the contact tips 58 of the sixteen fingers 54 remain substantially in the same plane perpendicular to the axis of the sonde 30 owing to the relatively small extension angle of the arm 54 in relation to the longitudinal direction, including its maximum extension position, and the relatively small amplitude of the variations in the radial position of the ends of the fingers furnishing the measurements.

The general organization of the apparatus for measuring the displacements of the fingers 54 will now be described in relation to FIG. 3. The explanations will then be given in greater detail with reference to FIGS. 4 through 6.

The caliper body 51 is composed of a tubular longitudinal part 90 within which is mounted a fixed cylindrical central tie rod 92. The part 90 has a star cross-section so as to leave, in correspondence with each finger and over the latter, a longitudinal channel 94 within which is mounted slidably a control linkage allowing the conversion of the swiveling movement of the fingers into a longitudinal displacement and the transmission of these displacements toward a series of sixteen electromagnetic displacement transducers 100 mounted in a barrel-shaped component 102 fixed at the top 104 of the body 90 by means not shown. The channels 94 are separated from the exterior of the sonde by a tubular jacket or envelope 106 mounted around the part 90 and forming the external wall of the caliper body 51. On its tubular upper part 108, the barrel body 102 is connected to a connection piece 110 having a lower male termination 112 penetrating into this tubular part 108 with which it is kept in sealed contact by means of two O-rings 114. The connection piece 110 also comprises an upper male part 116 which penetrates into a tubular sheath 120 delimiting the electronic cartridge 60, two O-rings 122 also being provided for the sealing of this connection.

Figure 4:
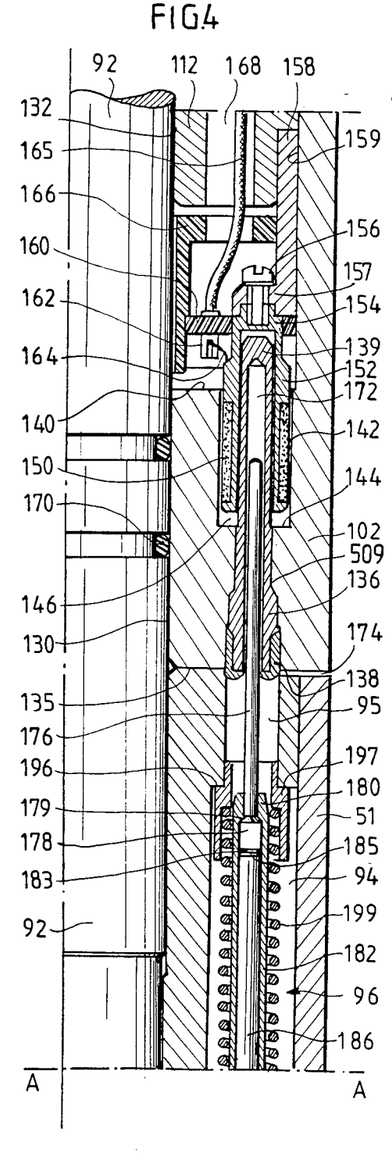
FIGS. 4 and 5 are longitudinal sections of enlarged portions of FIG. 3, FIG. 5 being placed under FIG. 4.
Figures 5, 6:
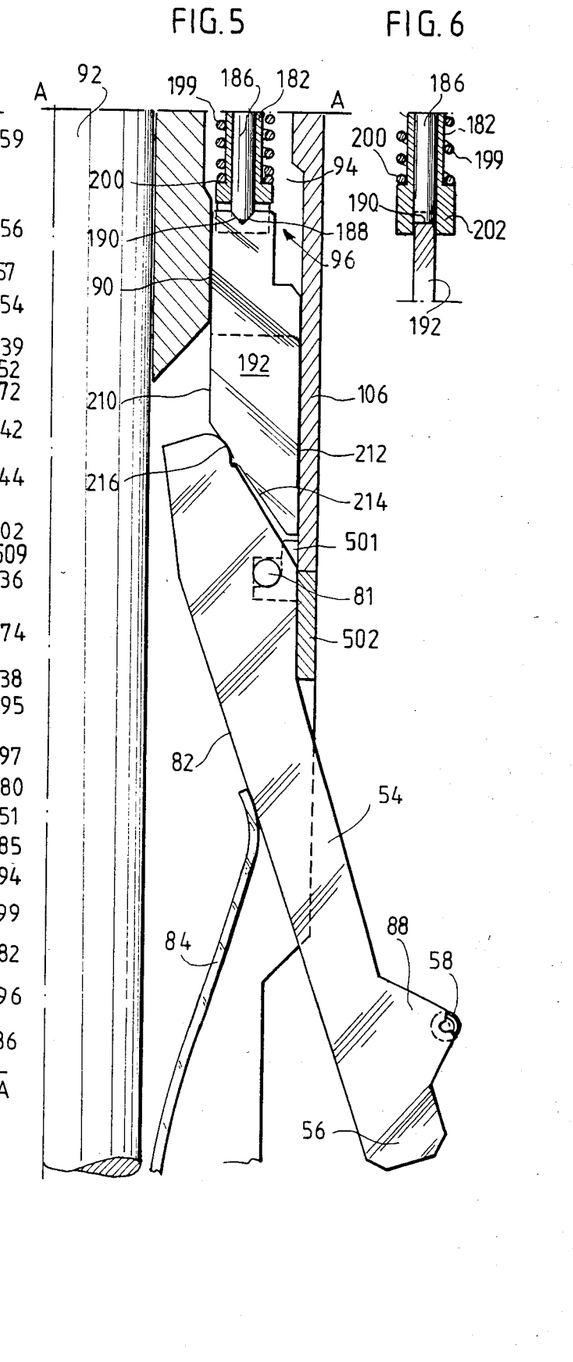
FIG. 6 is a view of a detail of FIG. 5 along a longitudinal section plane perpendicular to that of FIG. 5.
Figure 7:
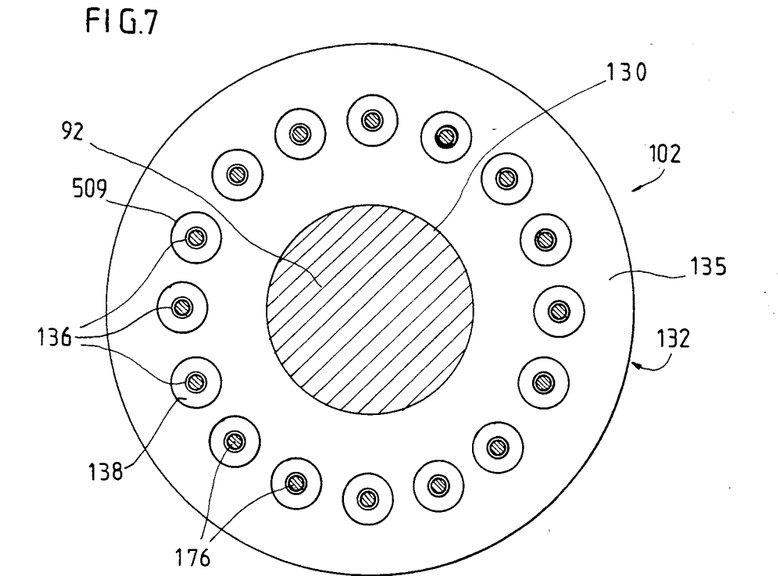
FIG. 7 is a bottom view of a barrel element illustrated in section in FIG. 3.

Reference will now be made to FIG. 4. The barrel 102 is pierced with a central hole 130 in which passes the tie rod 92, the latter extending into a passage 132 inside the connection piece 110. The bottom face 135 of the barrel 102 is in the form of an annular ring (FIG. 7) pierced with 16 longitudinal holes 509 in each of which is fitted a blind tube 136 whose lower end leads out onto the face 135, the other end 139 of the tube 136 being closed off (FIG. 4). The internal piercing 130 of the barrel 102 widens toward its upper part to define an annular plateau 140 perpendicular to the axis of the sonde and turned upward, within which are provided sixteen cylindrical bores 142 at the bottom 144 of each of which is located a respective blind tube 136. An annular recess 146 is provided between the external lateral wall of the upper part of each tube 136 and the internal lateral wall of the bores 142. Inside this annular space is mounted (FIG. 4) an induction coil 150 consisting of a winding of 1300 turns on a tubular form 152 whose upper part 154 fits over the blind end 139 of the blind tube or thimble 136. This upper part 154 of the form 152 is held by means of an attachment screw 156 in a ledge 157 at the bottom of a cylindrical supporting piece 158 placed against the internal wall of the barrel 102 in its widened part 159.

On the bottom face of the annular ledge 157 is applied an annular plate 160 in insulating material in which are mounted sixteen connection terminals 162. To each of these terminals is connected one of the ends 164 of the winding 150, the other end of this winding being connected to the ground. At its upper part, each of the terminals 162 is linked with a connection wire 165 going through an opening inside an insulating sleeve 166 placed around the central tie rod 92 and supported by the internal edge of the annular plate 160. The insulated connection wire 165 then goes through a longitudinal channel 168 provided at the lower end of the male termination 112 of the connection piece 110. This channel protects the wire 168 up to the electronic cartridge 60.

The form 152 of the coil 150 is made of nonmagnetic material such as titanium. The blind tube or thimble 136 is also made of nonmagnetic material, for example, Inconel. It is brazed at 138 in a sealed manner to the barrel body 102 so as to prevent any infiltration of liquid even at very high pressures between this tube and the annular recess 146 within which is placed the coil 150, the spreading of the brazing 138 around the opening of the tube normally being subjected to the internal pressure of the well, as explained below. The barrel body 102 is made of magnetic stainless steel. It will be noted that the coil 150 is entirely contained in the recess 146 and completely insulated magnetically by the body 102 of the adjacent coils. The upper part of the plate 140 and the recesses 146 are not subjected to the pressure prevailing on the ring-shaped bottom 135 of this barrel owing to the two O-ring seals 170.

The inner space 172 of the blind tube 136 is subjected, through its lower opening, to the pressure outside the sonde. The internal channel 94 in which is mounted the transmission control linkage 96 associated with each sensing finger 54 is in fact connected to the exterior, on the one hand, at its lower part through the corresponding opening 52 and, on the other hand, at its upper part by a thin slot 174 provided between the upper part of the jacket 51 and the lower face 135 of the barrel 102.

Inside each blind tube 136 is mounted longitudinally and moveably an elongated bar 176 in high permeability magnetic material forming the variable position core of the transducer 100. In the example described here, this core is made of solid nickel alloy sold under the name of Anister D by Acieries d'Imphy. It offers the advantage of maintaining its magnetic properties entirely whatever the external pressure to which it is subjected, unlike ferrite-based or laminated-structure materials. In this example, the bar 176 has a diameter of about 1.6 millimeter. Its length is 40 millimeters.

The lower end of the bar 176 is connected to the respective sensing arm 54 by the transmission control linkage 96 which provides bidirectional correspondence between the angular displacements of this arm around its swivelling axis 81 and the linear displacements of the end of the bar 176 inside the coil 150. The transmission system 96 moreover provides these displacements while avoiding the subjection of the bar 176 to any bending or twisting stresses by the means described below.

For this purpose, the lower end of the bar 176 has a boss 178 connected to the bar proper by a transition surface in the form of a spherical ring 179 forming an olive portion against which is applied the lower surface of a thickening inside the end 180 of a tube or pump 182 so as to be able to exert, through the latter, traction forces tending to bring the bar 176 out of the tube 172 without imparting any reverse thrust to it.

The base of bottom face 183 of the boss 178 is rounded and in contact with a rounded upper face 185 of a needle rod 186 mounted inside the pump 182. The end 188 of the needle rod 186 (FIG. 5) is beveled and fits into a slot of triangular section (see also FIG. 6) 190 provided in the upper face of a wedge-shaped part 192 guided to slide within the channel 94. A shoulder 196 is formed in this channel against which is applied, from the bottom up, a bush 197 within which is placed the upper end of the pump 180 and which has an upper stop for a coil spring 199 mounted around the pump 182 (FIG. 4) and whose lower end (FIG. 5) comes up against a shoulder 200 at the bottom of the pump 182. The spring 199 works under compression to exert, by reaction against the bush 197, a force drawing the bar 176 via the pump 182 against the needle rod 186.

The bottom 202 of the pump 182 forms a yoke (FIG. 6) framing the end 188 of the needle rod 186 and the top of the wedge-shaped piece 192.

The piece 192 is guided longitudinally to slide between the body 90 and the jacket 106 (FIG. 5) by two parallel faces 210 and 212 connected by an oblique face 214 which moves downward away from the axis of the sonde. Against this face 214 abuts the head 216 of the sensing finger at the upper end of the latter, over the swiveling axis 81, which is supported by a bearing 501 linked with the body 51, a retaining ring 502 at the base of this envelope limiting the swiveling range of the finger 54.

Thus, in operation, when the release mechanism has been actuated, all the fingers 54 are applied by the corresponding springs 84 against the internal wall of the tube into which the sonde 30 is lowered. The sonde is kept in a centered position in relation to the axis of this tube by the centering module 40. Consequently, the only swiveling movements possible for the fingers 54 are due to variations in the internal radius of the tested tube in accordance with the surface irregularities which may result from various wear and corrosion phenomena. The radial displacements of the finger tips 58 are transmitted to the head 216 of each finger 54 and, by the sliding of this head against the inclined face 214 of the wedges 192, transformed into a longitudinal movement of the wedges which is transmitted without clearance, by the previously described needle and pump system, to the magnetic core or bar 176. The self-inductance of the coil 150 varies according to the penetration of the bar 176 within its internal space. The measurement of this self-inductance is carried out by determining an electrical characteristic of a circuit in which this coil is connected, as will be explained below. This measurement makes it possible to determine precisely the variations in the position of the bar 176 within the coil as a function of the displacements of the sensing fingers 54 during the movement of the sonde.

The coil 150 is not subjected to the action of the pressure prevailing inside the production string tubing (this pressure being capable of varying within considerable proportions with the depth of the sonde) thanks to the O-rings 170 on the tie rod 92 and especially because its internal space is insulated from the environment within which the bar 176 moves by the blind tube 136 mounted like a thimble on the barrel 102.

The magnetic characteristics of the bar 176 are not sensitive to the pressure to which it is subjected within the cavity 172 of the blind tube 136 and within the space 95 over the channel 94. Advantageously, this space 95 is filled with a grease, the slots 174 allowing the movement of the bar 176 and of the control linkage 96 without creating an overpressure effect tending to oppose the penetration of the bar 176 into the coil 150.

Thanks to this special design, the bar 176 is not subjected to any bending or twisting forces.

In the sonde described above, whose diameter in the retracted position of the fingers is 54 millimeters, each of the sixteen fingers can move within a variation range falling, for example, between 0 and 14 millimeters approximately. This variation range is effective for the checking of pipes, such as oilfield production tubing or borehole casings, whose diameters vary between 59 and 82 millimeters. The total travel of the bar 176 between the position in which it is brought entirely back into the coil when the finger 54 is retracted completely into the corresponding opening 52, on the one hand, and the maximum extension position of the finger, is about 7 millimeters in this example.

The relationship between the displacements of the contact tip 58 of each finger in the radial direction and the corresponding longitudinal displacements of the bars 176 is linear to within 1.5 in %.

The tool can be used in environments in which the pressure can reach values of 700 bars. Using means to be described below it is possible to detect the displacements of the magnetic bar 176 with an accuracy greater than 0.5 millimeter on the radius and with a resolution lower than 0.1 millimeter.

We shall now describe, with reference to FIGS. 8 through 11, the make-up of a circuit for measuriing the displacement of the bar 176 within the coil 150.

The circuit makes it possible to obtain 200 numerical measurement points on the variation range of the position of the fingers previously indicated, i.e. about 0.075 millimeter difference in radius between two successive numerical values furnished at the output of this device. The numerical output signals are linear functions of the variation of the checked radius with an accuracy better than 1% on about 70% of this range, for temperatures which can vary from 15° C. to 150° C. or even 175° C. at the bottom of an oil well.

Each coil 150 (FIG. 8) of a transducer 100 is mounted electrically between the ground M of the sonde (ground of metallic form 152) and a junction 300 to which it is connected by the link 165 previously described and which is connected to an input 302 of a comparator 304 receiving a signal U (L, r) in which U is a voltage, L the self-inductance of the coil 150 and r is a resistance including the inherent resistance of the coil 150 and a resistance equivalent to the losses generated in the magnetic bar 176 by eddy currents.

Figure 8:
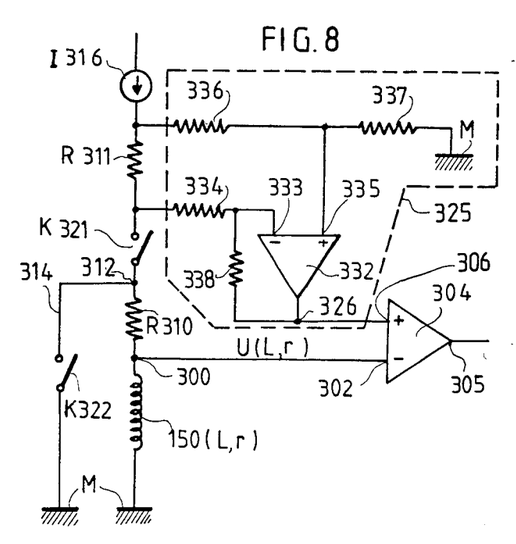
FIG. 8 is a circuit diagram used for a displacement transducer implemented in the sonde of the preceding figures.

In series with the coil 150 is connected a loading resistor R 310 of resistance R between the junction 300 and a junction 312 which is connected, on the one hand, to the ground M by a link 314 via a switch K 322 represented schematically as a mechanical contact but which in practice can consist of a static switching circuit using well-known means. The junction 312 is moreover connected to a constant current generator I 316 through a resistor R 311 having a resistance value of $R_1$ which develops between its terminals a voltage v equal to $R_1 \times I$, where I is the current produced by the constant current generator I 316. Between the resistor 311 and the junction 312 is provided a switch K 321.

The voltage v taken at the terminals of the resistor R 311 is applied to the input of a multiplying amplifier 325 whose output 326 is connected to the second input 306 of the comparator 304 for the application of a voltage signal $\beta I$, where $\beta$ is a proportionality coefficient fixed by the gain of the amplifying network 325. The latter is made up in a conventional manner of a differential amplifier 332 having one input 333 connected to one of the terminals of the resistor R 311 through a resistor 334, and the other input 335 connected to a voltage divider formed by resistors 336 and 337 between the other terminal of the resistor R 311 and the ground, the amplification ratio being fixed by a resistor 338 feedback-connected between the output 326 and the input 333 of the amplifier 332.

In operation, the switches K 321 and K 322 are open at the beginning of the measurement. The measurement begins by the closing of the switch K 321, causing the sudden variation in the voltage at the junction 300 of the coil 150 and of the resistor R 310 from a zero value to a value $U_1$. The application of this voltage pulse is followed by a transient corresponding to the gradual build-up of the current I in the coil 150 up to a time $t_1$ (see FIGS. 9 and 10) when the voltage of the junction 300 is stabilized at a value equal to r I when the coil is traversed by the imposed direct current I.

The switch K 322 is then closed at the time $t_1$, having the effect of short-circuiting the series circuit formed by the resistor R 310 and the coil 150, the current I flowing through the short-circuit connection 314. The result is that the voltage of the junction 300 drops suddenly to a negative value $-R$ I under the action of which the coil goes into a transient discharge condition under the action of a current which tends to bring the potential difference between its terminals to a zero value. In other words, the short-circuiting of the circuit R (310) and L (150) results in the application of a voltage pulse at the terminals of the coil 150 from which the voltage at these terminals goes into a transient phase.

The gain of the amplifier 325 is chosen so that the voltage at the input 306 of the comparator 304 corresponds to a predetermined fraction of the voltage $-RI$ of the voltage step applied to the junction 300 at the time $t_1$. The gain of the amplifier 325 is moreover chosen so that the voltage $-\beta I$ is negative. A signal 370 thus appears on the output 305 (vc) at the time $t_1$.

When the comparator 304 detects the $t_2$ when the decreasing voltage at the junction 300 goes through the value $-\beta I$, the signal 370 produced at its output 305 is cancelled, thereby enabling the measurement of the interval $\Delta t$ between the times $t_1$ and $t_2$, this interval being measured by clock pulse counting as described below.

The interval $\Delta t = t_2 - t_1$ is related to the value of the voltage U (L, r) at the junction 300 by the relationship:

$$U(L, r) = R\,I \exp\left(-\frac{t - t_1}{\frac{L}{R + r}}\right) \tag{1}$$

where t is the time considered during which the decreasing evolution (in absolute value) of the voltage U and $L/R+r$ is the time constant of the series circuit made up of the coil 150 and the resistor R 310 in series, R being the resistance of the latter resistor.

At the time $t_2$, where $U(L,r)$ is equal to $-\beta I$, it is possible to write:

$$t_2 - t_1 = \left(\mathrm{Log}\frac{R}{r}\right)\frac{L}{R+r} \tag{2}$$

In these relationships, exp is the exponential function and Log represents the Napierian logarithmic function. It is noted that the time interval $\Delta t$ is a linear function of the time constant $L/R+r$. To the extent that it is possible to consider the magnetic damping losses in the core 176 as negligible over a wide core displacement interval, the measured time interval t is proportional to the self-inductance L which is itself a linear function of the displacement of the core 176 within the coil 150.

Figure 9:
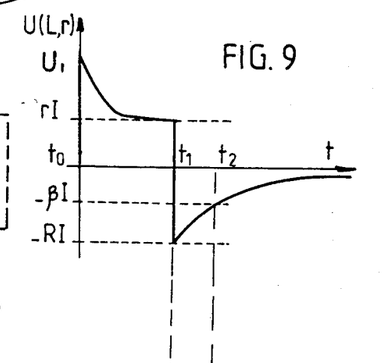
FIGS. 9 and 10 are signal diagrams as a function of time used in the explanations of the operation of the circuit of FIG. 8.
Figure 10:
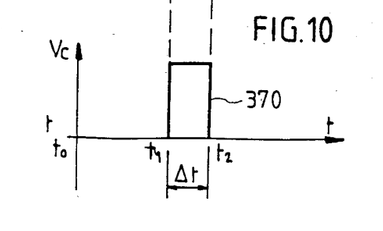

A measurement of the degree of coil penetration is thus obtained very simply by following the sequence of operations illustrated by FIGS. 9 and 10 and which include, at a first time $t_0$, the application of a current step to the resistor-coil circuit (R 310, L 150) connected in series then, after the stabilization of the current in the coil 150, short-circuiting, at a time $t_1$, of the resistor-coil circuit and measurement of the time interval $\Delta t$ required for the current through the coil to reach a predetermined fraction of the initially applied current.

With a coil having 1300 turns and a magnetic bar 176 whose dimensions and travel have been indicated earlier, the useful variation in the self-inductance L of the coil 150 is approximately between 2.5 and 30 millihenrys. Such a winding can be obtained easily with a wire of 0.08 millimeters diameter on a metal form 6 millimeters in diameter and 25 millimeters long.

Taking into account the resistance r of this coil, which varies as a function of the temperature of the copper making up the coil approximately from 75 to 100 ohms (including the resistance equivalent to the magnetic damping losses), a resistance value of 100 ohms is used for the resistor R 310 in this example. The respective time constant of the circuit then varies within a range of 15 microseconds to about 150 microseconds, if we neglect for the moment the influence of temperature variations. The current produced by the constant current generator I 316 can be chosen at a value of about 10 milliamperes. It is noted that this value is not in any way critical and is essentially dependent upon the possibilities of the detection electronics of the comparator 304. It is noted in particular that any variations in the current I with the temperature between two different measurements spaced in time have no influence on the accuracy of the measurements, the measured time $\Delta t$ corresponding to a relative drop in the current in the coil 150 and, consequently, being independent of the absolute value of the latter. Moreover, the duration $\Delta t$ is sufficiently short so that any temperature variation capable of modifying the value of the current I cannot occur in this interval.

The maximum duration of the interval $\Delta t$ in this example is about 100 microseconds. The interval between the times $t_1$ and $t_0$, necessary for the build-up of the current I in the coil 150, is hardly more than about 100 microseconds.

For the range of variation in the time constant indicated, the duration of the measurement hence varies approximately between 1 microsecond and 100 microseconds. A resolution of 200 measurement points is obtained in this interval using a 2-MHz clock to measure time intervals by counting the clock pulses between the times $t_1$ and $t_2$.

It was seen that, if the measured time is independent of the current used for the measurement, on the other hand it is dependent on the value of the resistance r which is itself dependent on the temperature, which can vary in considerable proportions between the surface and the bottom of a well, where it can reach 160° C. and even 175° C.

In order to obtain a first-degree correction, a reference transducer 400 (FIG. 3) is provided which has a coil identical to the coil 150 in which a magnetic bar identical to the bar 176 is blocked in a medium longitudinal position. This reference transducer 400 (FIG. 3) is placed immediately over the ring of transducers 100, within a longitudinal bore 402 made in the male lower part 112 of the connection element 110, this part being fitted at the upper end of the barrel body 102. Hence, the transducer 400, which is connected by a conductor (not shown) to the electronic cartridge 60, is in the immediate vicinity of the ring of transducers 100 under identical temperature conditions. Consequently, if a measurement of the time interval $\Delta t$ is carried out for this transducer within a space of time which is close as concerns the measurements of the transducers 100, it is possible to obtain a means of correcting the effects of the temperature variations on the measurements of the transducers 100. For this purpose, the measurement of the transducer 400 is transmitted to the surface along with the measurements of the transducers 100. The corresponding correction is carried out on the surface.

If N (20) and N'(20) are respectively the count levels corresponding to the time intervals $\Delta t$ measured in one of the transducers 100 and in the reference transducer 400 at the temperature of 20° C., and if N (100) and N'(100) are the values of these time intervals measured at 100° C., the measured value N (100) can be corrected to obtain a value approximately the measurement at 20° C. according to the relationship:

$$N(20) \simeq N(100) \times \frac{N'(20)}{N'(100)} \tag{3}$$

This relationship provides an exact correction if the penetration position of the magnetic core of the transducer 100 is the same as that of the magnetic core in the transducer 400. It was however seen that the equivalent magnetic-effect-loss resistance depended on the degree of bar penetration. Consequently, the correction thus obtained is only a first-degree correction for the displacement interval of the core of the transducer. Tests have however demonstrated that this correction is altogether sufficient for the accuracy indicated on the radius measurements carried out for each finger. When a greater accuracy is desired, it is possible to obtain a correction of the temperature effects involving correction polynomials established on the basis of the measurements of the reference transducer and the measurements to be corrected.

Figure 11:
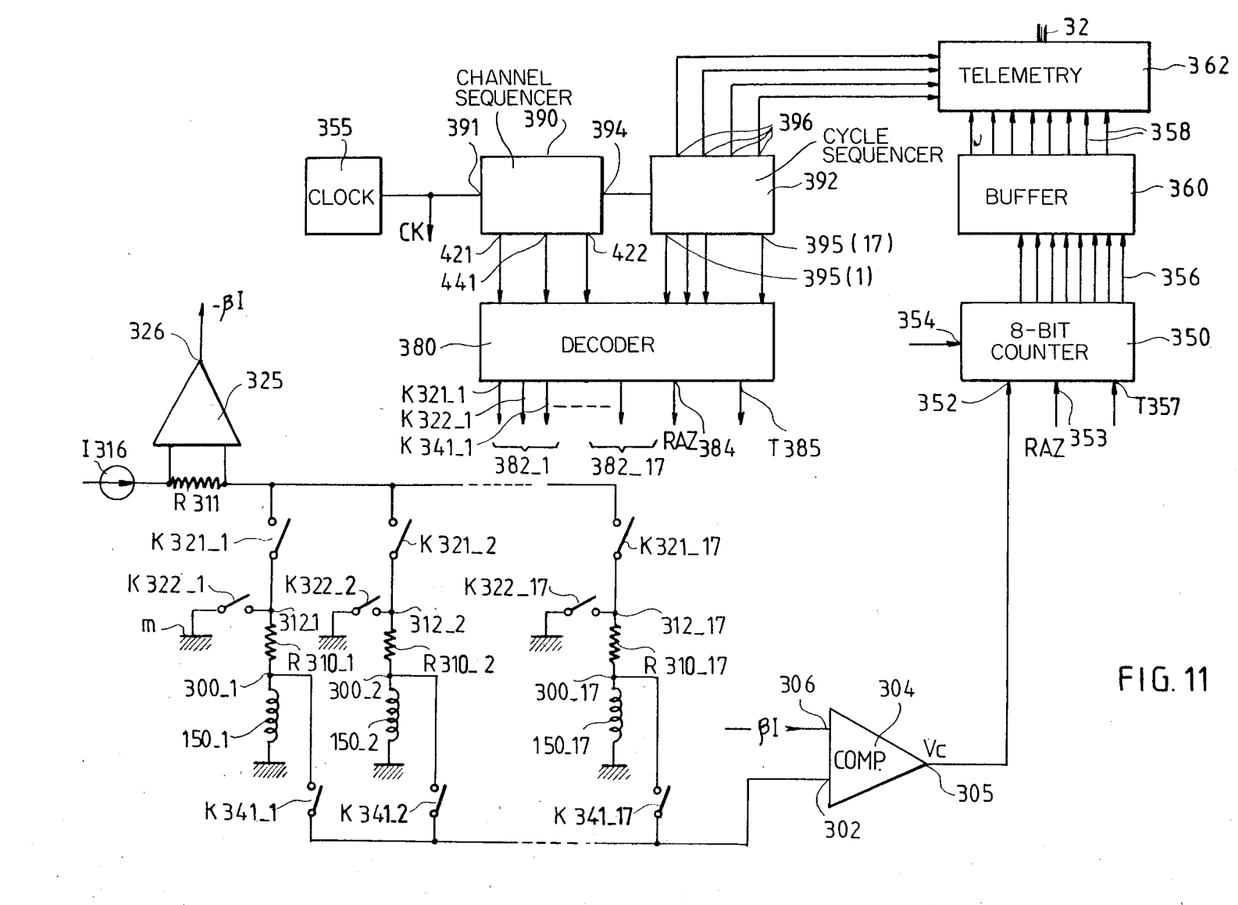
FIG. 11 is a schematic representation of the arrangement of the measurement circuits of all the transducers of the sonde of the preceding figures.

In FIG. 11 has been represented, in a slightly modified form, the electric circuit diagram associated with each of the coils respectively 150-1, 150-2, ... 150-17 of the sixteen transducers 100 and the transducer 400 of the device with their associated resistors R 310-1 to R 310-17, the respective junction points 300-1 to 300-17 being connectable selectively to the input 302 of the comparator 304 by means of respective switches K 341-1, K 341-2 to K 341-17.

The junctions 312-1 to 312-17 can be connected to the ground by respective short-circuiting connections through switches K 322-1 to K 322-17 and to the resistor R 311 connected at the output of the current generator I 316 by a bank of parallel-connected switches K 321-1 to K 321-17.

As previously, the voltage at the terminals of the resistor R 311 is taken by the amplifier 325 whose output 326 applies the voltage signal $-\beta I$ on the input 306 of the comparator 304.

The output 305 of this comparator 304 is connected to an on-off input 352 of an eight-bit digital counter 350 supplied by a pulse signal $C_K$ on its input 354 coming from a 2-MHz clock circuit 355. The counter 350 comprises eight parallel outputs 356, one per bit, which are connected in parallel to the respective inputs of a buffer register 360 which maintains the count values transferred to it from the counter, available on eight parallel bit outputs 358 for transmission along the electric cable from which the sonde 30 is suspended via a telemetering device 362 also contained in the cartridge 60.

The counter 350 also includes a reset input 353 and a transfer input T 357 designed to validate the transmission of the count level reached between a start signal and a stop signal on its input 352 in the buffer register 360 through the outputs 256.

In operation, the switches K having the same index 1 to 17 are each actuated during a measurement sequence making it possible to produce for each coil 150-1 to 150-17 in turn a charge period between a time $t_0$ and a time $t_1$ and a discharge period between times $t_1$ and $t_2$ during which the output 305 of the comparator produces a voltage pulse $V_C$ (curve 370, FIG. 10). It is noted that at the instant $t_1$ the voltage U (L,r) goes suddenly through the voltage level $-\beta I$ toward the negative values. This level is re-traversed during the exponential decay of the current of the coil 150 at the time $t_2$. The signal at the output 305 hence corresponds to the duration of the interval $\Delta t$. The counter 350 is energized for the duration of this signal, the counted value thus representing a numerical indication of this duration.

Thus, after the measurement cycle on the coil 150-1 involving the switches K 321-1, K 322-1 and K 341-1, these switches are all brought to the open condition and a measurement cycle is undertaken on the coil 150-2 by the actuation of the switches K 321-2, K 322-2 and 341-2.

The switching sequences are controlled by a decoding logic 380 having 17×3 control outputs forming 17 groups of 3 channel outputs 382-1 to 382-17. Each group of control outputs corresponds to a measurement cycle and includes, for example for the group 382-1, a control output for the switch K 321-1, a control output for the switch K 322-1 and a control output for the switch K 341-1 according to the sequence required for controlling the measurement of the displacement in the coil 150-1. The logic 380 also includes a reset output 384 connected to the reset input 353 of the counter 350, and a transfer output R 385 connected to the transfer input of the counter T 357 whose function was explained earlier.

The decoding logic is controlled through a channel sequencing circuit 390 and a cycle sequencing circuit 392. These two circuits include counters, the input 391 of the circuit 390 being connected to the output of the clock circuit 355. The circuit 390 is equipped with decoders for the output states of its counter to produce: on a first output 421 connected to a respective input of the logic 380 a signal corresponding to the closing of the switches K 321 at the time $t_0$ beginning each cycle; on the output 441 connected to a respective input of the decoding logic, a signal for closing the switches K 341 at a time $t_1$; and on a third output 422 also connected to a respective input of the logic 380, a signal for controlling the switches K 322 at the same time $t_1$ of each sequence.

At the end of each measurement cycle on a coil, the output 394 of the sequencing circuit 390 controls the input of the cycle counter 392 which has 17 outputs 395-1 to 395-17 connected to 17 respective inputs of the decoding logic to allow the passage through the latter of control signals 421, 441 and 422 to the switches associated with the next coil. The sequencing circuit 392 also includes a four-parallel-bit binary code output 396 furnishing a numerical indication of the address of the transducer corresponding to the energized output among the outputs 395-1 to 395-17. The address bits 396 are transmitted to the telemetering circuit 362 for the formation of a message on the cable 32 associating with each transducer (coils 150-1 to 150-17) the numerical value N of the corresponding measured time interval $\Delta t$.

Thus, the measurement of the displacement of the bar in each coil takes place, according to the invention, in a sequential manner to directly obtain a numerical indication varying practically linearly with the corresponding displacement. Moreover, this discontinuous character of the measurement is used to carry out a sequential interrogation of each transducer. Such a measurement sequence is well suited notably in the case of a sonde suspended from a cable in which the transmission of measurement data takes place in series. Furthermore, in the case of a sonde intended to be lowered into a well through tubes of small diameter, space is saved by using a single electronic system for measurement (comparator 304, amplifier 325) and for time counting (counter 350). The sequential nature of the operation of each coil moreover offers the advantage of eliminating any crosstalk by magnetic coupling between the coils 150-1 to 150-16.

The actual measurement devices, i.e. the coils with their associated cores or bars are of great simplicity. A displacement transducer has in fact been devised which comprises a single coil operating by means of a very simple circuit not requiring any capacitor or any oscillating device and which has the merit of providing a linear response to relative displacements of the magnetic bar and of the coil. This linearity of variation is obtained over a large fraction of the transducer displacement range. The signal obtained is displayed directly in digital form, thus offering advantages in many cases for the processing of a subsequent measurement data transmission. It will moreover be noted that this transducer permits such sequential measurements at a relatively high frequency, at least higher than 500 Hz in the chosen example. This makes it possible, notably in the case where sequential measurements are desired on several transducers, to scan all the measurement channels in a relatively small time. In the case of a sonde, this time is notably altogether compatible with an acceptable measurement density as a function of depth. As an example, with a sonde raised in a tube at a speed of 30 centimeters per second, the number of measurements furnished by each finger, i.e. on each of the sixteen generatrices of the examined tube, is slightly less than 1 measurement per centimeter.

The displacement transducer just described also offers, in addition to its simplicity, the advantge that the measurements carried out are practically independent of variations in the measurement current as a function of temperature. It moreover lends itself readily to a correction of the measurement values obtained as a function of utilization temperature, which is very valuable in the case of a sonde designed to be lowered in a well in which there are considerable temperature variations.

Within the framework of the application of such a displacement transducer to the design of a caliper logging sonde, it makes it possible, owing to its small size, to install a large number of fingers around the body member of the sonde with its corresponding transducer. Further, notably compared with prior-art arrangements, such a displacement transducer requires the passage of only one wire per coil in the direction of the electronic cartridge, does not present any problem as concerns the variation of the characteristics of the measurement as a function of frequency, and permits sequential measurements at high frequency owing to the very short stabilization time required for establishing the current applied to the coil and preceding the actual measurement.

Finally, such displacement transducers are particularly well suited to the design of a caliper logging sonde, notably for measurements in wells, in which the cores of the transducers are made up of bars consisting of solid high permeability magnetic material which can move within an element in the form of a thimble exposed to the external pressure, which can vary considerably, and the coil can be placed in a small volume around said thimble shaped component. A caliper logging system has thus been achieved comprising a very large number of transducers with a minimum number of moving parts and combining high operating reliability with suitable accuracy.

We claim:

1. Apparatus for measuring the internal dimensions of a tube, notably in a well, comprising:
   an elongated sonde body member movable within the tube to be measured;
   a plurality of sensing fingers mounted on the sonde body member for contacting the walls of the tube and movable with respect to the sonde body member in response to variations in the internal transverse dimensions of the tube when the sonde body member is moved within the tube;
   a barrell structure linked with the sonde body member to provide an interior space sealed against exposure to the pressure prevailing in the tube; and
   a displacement transducer associated with each sensing finger, comprising:
   a blind tube protruding in a sealed manner into the interior space of the barrel structure so that at least part of the outer surface at the closed end of the blind tube is sealed within the interior space, while the inside of the blind tube is exposed at the open end to the pressure prevailing in the tube to be measured;
   a mobile element extending into the inside of the blind tube through its open end;
   detection means located within the interior space in a position around the at least part of the outer surface of the blind tube, the detection means being sensitive to variations in the position of the mobile element within the blind tube to produce an electrical signal corresponding to the movement of the mobile element; and
   transmission means mechanically linking the mobile element and the resepective sensing finger to cause movement of the mobile element within the blind tube in response to movement of the finger.

2. Apparatus as in claim 1, wherein the mobile element is a rod of magnetic material and the detection means is an electric coil.

3. Apparatus as in claim 1, wherein the transmission means comprises a mechanism capable of relieving the mobile element of transverse stresses with respect to its direction of travel in the blind tube.

4. Apparatus as in claims 1 or 3, wherein the sonde body member is further provided with a plurality of longitudinal channels having lower openings facing the fingers and upper openings facing the open ends of the blind tubes, and wherein the transmission means are mounted between each finger and mobile element through a respective one of said longitudinal channels.

5. Apparatus for measuring the transverse dimensions of a tube, notably in a well, comprising:
   a sonde body member movable within the tube to be measured;
   a plurality of sensing fingers movably mounted on the sonde body member;
   means for resiliently loading each finger in a radial direction away from the sonde body member so as to bias the fingers into contact with the internal wall of the tube and to cause the fingers to move in accordance with changes in the internal transverse dimensions of the tube as the sonde body member is moved longitudinally within the tube;
   a plurality of displacement transducers, each comprising a magnetically permeable core and a coil which are mounted on the sonde body member for relative movement with respect to each other; and
   transmission means for transmitting the transverse movement of each finger to a respective one of the displacement transducers;
   each of the displacement transducers comprising at least one measurement circuit including the coil, means for applying a voltage transient to the terminals of the coil, and means for measuring the time required for the electrical current through the coil to undergo a predetermined evolution in response to the transient.

6. Apparatus as in claim 5, wherein the measurement circuit comprises a detector sensitive to a predetermined relative variation in the current through the coil in response to the application of the transient, and means for measuring the time interval during which this variation takes place.

7. Apparatus as in either of claims 5 or 7, wherein the time measurement means comprises a clock pulse counter capable of furnishing a numerical indication of the measured time interval.

8. Apparatus for measuring the transverse dimensions of a tube, notably in a well, comprising:
   sonde body member movable within the tube to be measured;
   a plurality of sensing fingers movably mounted on the sonde body member;
   means for resiliently loading each finger in a radial direction away from the sonde body member so as to bias the fingers into contact with the internal wall of the tube and to cause the fingers to move in accordance with changes in the internal transverse dimensions of the tube as the sonde body member is moved longitudinally within the tube;

a plurality of displacement transducers, each comprising a magnetically permeable core and a coil which are mounted on the sonde body member for relative movement with respect to each other;

transmission means for transmitting the transverse movement of each finger to a respective one of the displacement transducers;

and, further comprising for each coil, a resistor connected in series with the coil; means for applying a predetermined current to the core through the resistor; means for producing, after build up of current in the coil, the discharge of the coil through said resistor; and detection means capable of detecting the time required for the current of decreasing amplitude in the coil to go through a value corresponding to a predetermined fraction of its initial amplitude in the coil.

9. Apparatus as in claim 8, wherein the coils are arranged in a circular ring around and within the sonde body member, and wherein the transmission means are capable of converting the movements of each respective finger into a longitudinally displacement of the magnetically permeable core inside the respective coil.

10. Apparatus as in claim 8, further comprising switching means common to all the coils, for the cyclic switching of the current applying means and the time interval detection means.

11. Apparatus as in any of claims 8 through 10, further comprising means, independent of the fingers, for centering the sonde body within the tube to be tested.

12. Apparatus as in claim 10, further comprising a reference transducer mounted in the sonde body member in the immediate vicinity of the displacement transducers associated with the fingers and whose core is kept in a reference position, said reference transducer being subjected to the control of the cyclic switching means so as to furnish, during each measurement cycle, a reference measurement allowing a temperature correction for the measurements coming from the other transducers.

13. Apparatus as in any of claims 8, 9, 10, or 12 wherein the core of each transducer is a bar of massive magnetic material insensitive to pressure and mounted slideably within a blind tube linked in a sealed manner with the sonde body member so that its internal space is subjected to the pressure prevailing outside this body member while at least part of its external space, around which is mounted the coil of the transducer, is relieved of the influence of this pressure.

* * * * *